EDMOND S. PERRY
FRANCIS J. MANSING
INVENTOR.

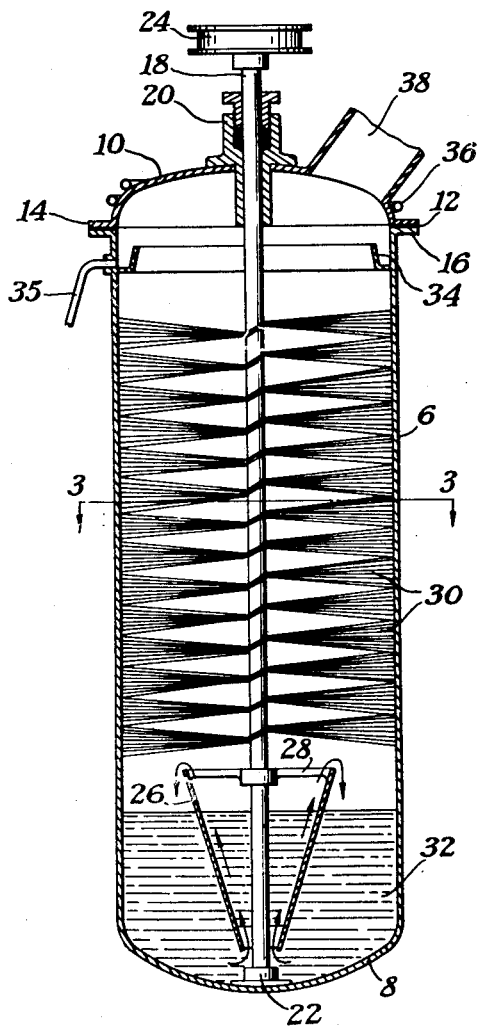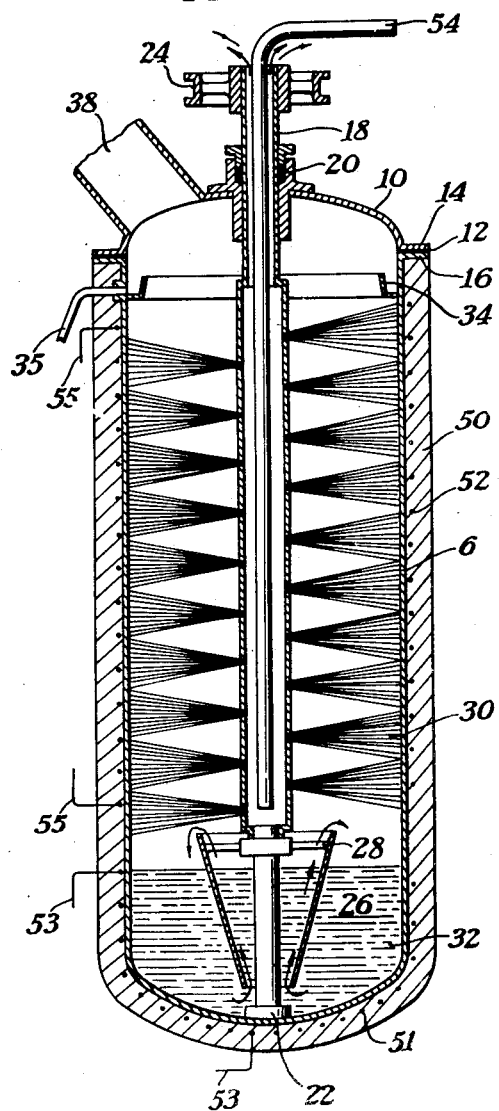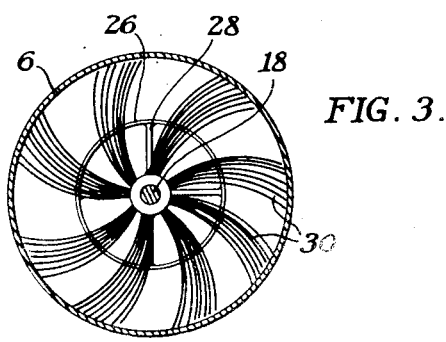

BY Warren H. Cannon
ATTORNEY.

Patented Jan. 30, 1951

2,539,699

UNITED STATES PATENT OFFICE 2,539,699

DISTILLATION PROCESS AND APPARATUS

Edmond S. Perry and Francis J. Mansing, Rochester, N. Y., assignors, by mesne assignments, to Eastman Kodak Company, Rochester, N. Y., a corporation of New Jersey Application June 13, 1944, Serial No. 540,020

10 Claims. (Cl. 202—52)

This invention relates to improved distillation process and apparatus and in particular to process and apparatus for fractionation under vacuum conditions.

Vacuum fractionation is known in the prior art. It has been previously proposed that widely spaced fractionating plates with large apertures for flow of vapors be used in vacuum fractionating columns in order to avoid pressure drop. Thus, ordinary fractionating columns are unsatisfactory for vacuum fractionation due to the great resistance offered to the flow of vapors through the bubble caps which are ordinarily employed. While the use of the above-mentioned widely spaced plates with wide apertures represented a real improvement in vacuum fractionation, it was not a complete solution of the problem. The plates even though widely spaced and provided with wide apertures still caused considerable pressure drop. Also, because of their construction they caused poor interchange between the reflux condensate on the plates and the vapors passing through the column.

Our invention has for its object to provide improved vacuum fractionation process and apparatus. Another object is to provide improved apparatus and process for fractionation under high vacuum unobstructed path distillation conditions. A further object is to provide vacuum fractionation process and apparatus wherein pressure drop is kept at a minimum and wherein intimate contact between reflux condensate and fractionating vapors is obtained. Other objects will appear hereinafter.

In the following description we have set forth several of the preferred embodiments of our invention, but it is to be understood that these are given for the purpose of illustration and not in limitation thereof.

In the accompanying drawings, wherein like numbers refer to like parts, we have illustrated preferred embodiments of our invention wherein:

Fig. 1 is an elevation partly in section of our improved fractionating apparatus;

Fig. 2 is an elevation partly in section of a modification of the apparatus illustrated in Fig. 1;

Fig. 3 is a horizontal section taken on line 3—3 of Fig. 1; and

Figure 4:
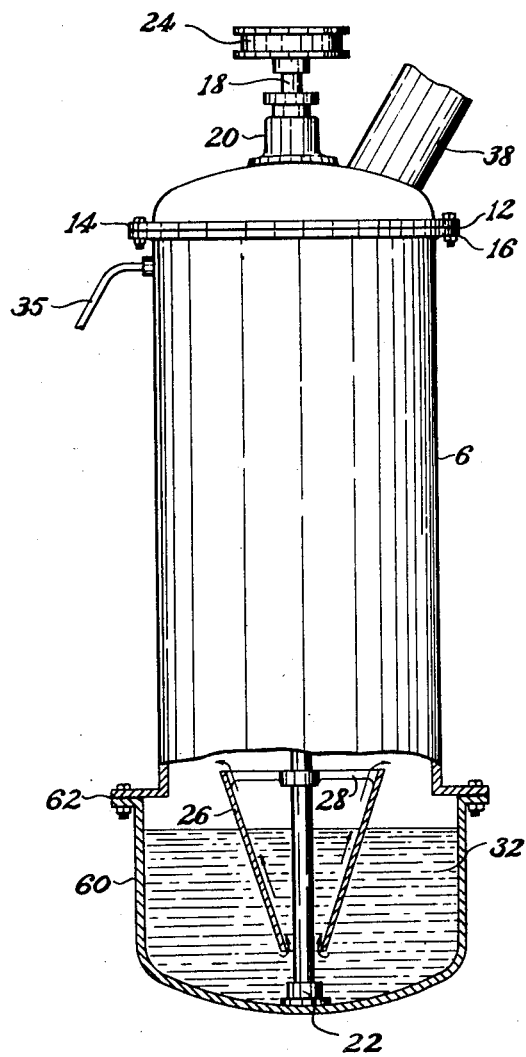
Fig. 4 is an elevation partly in section of a modification of the apparatus shown in Fig. 1.

Referring to Figs. 1 and 3, numeral 6 designates a cylindrical fractionating column provided with an integral base 8 and a removable cover 10, which is sealed, during the operation, to the cylindrical casing by means of gasket 12 placed between flanges 14 and 16. Numeral 18, designates a shaft rotatably mounted in packed bearing 20 and thrust bearing 22. Numeral 24 designates a pulley for rotating shaft 18. Numeral 26 indicates a truncated cone rigidly held in the position shown by spider 28. Numeral 30 designates wire bristles which are mounted upon shaft 18 and which are preferably of sufficient length to make contact with the inside surface of casing 6. Numeral 32 designates a body of material to be distilled and fractionated. Numeral 34 designates an annular gutter mounted upon the inside upper wall of casing 6. Numeral 36 designates a cooling coil mounted upon the outside wall of cover 10, while numeral 38 designates a conduit through which gases are evacuated by means of pumps (not shown).

Referring to Fig. 2, it will be noted that the apparatus illustrated therein closely resembles that shown in Fig. 1, except that it is provided with an insulating jacket indicated by the numeral 50, in which is embedded electrical resistance heaters 51 and 52 heated by current supplied to leads 53 and 55 respectively. It also differs from Fig. 1 in that shaft 18 is hollow and is provided with a conduit 54 through which cooling fluid is introduced so as to maintain shaft 18 in a cooled condition.

During operation of the apparatus illustrated in Figs. 1 and 3, the system is evacuated to the desired extent through conduit 38. Force is applied to pulley 24 to cause shaft 18, the bristles 30, and truncated cone 26, to rotate. Heat is applied to the base 8. Cone 26 acts as a centrifugal pump. The liquid is drawn into the bottom of the cone, is caused to flow by centrifugal force over the upper lip of the cone, and against the opposite wall of 6. This causes effective stirring of the liquid to be distilled and results in rapid renewal of the distilling surface of the liquid. The vapors generated from the liquid 2 pass upwardly through the bristles 30. These vapors become partially condensed thereon. The liquid condensate is thrown by centrifugal force onto the wall 6. The surface of this liquid is rapidly renewed by the sweeping action of the ends of the bristles so that it comes into intimate contact with the vapors passing upward. The heat of the vapors causes vaporization of the lighter portions of the condensate and these re-evaporated vapors pass upward where they come into intimate contact with reflux condensate on the upper bristles. There is thus intimate contact between reflux condensate and distilling vapors with repeated re-evaporations and recondensations.

This results in improved fractionation. The vapors surviving passage through the brush are condensed upon the upper inside wall of cap 10 and flow by gravity into gutter 34. They are removed by way of withdrawal conduit 35.

The operation of the apparatus illustrated in Fig. 2, is the same as that illustrated in Fig. 1, except that cooling fluid is introduced through conduit 54 and the wall of casing 6 is heated. The cooling of shaft 18 causes at least part of the bristles near the shaft to be cooled and this in turn causes a greater amount of the reflux to be formed on the bristles. The heating of the wall of casing 6 causes a larger number of re-evaporations of the reflux condensate. The apparatus illustrated in Fig. 2, therefore, causes more efficient fractionation since it results in a greater amount of reflux and in a larger number of re-evaporations and condensations.

Referring to Fig. 4 numeral 60 indicates a pot attached to column 6 of Fig. 1 of bolted flange 62, the operation of the apparatus of Fig. 4 being the same as that of Fig. 1, pot 60 serving as a means for supplying vapor to the column.

One of the important advantages of our invention is that the bristles of the brush offer but slight resistance to the flow of vapors therethrough, so that pressure drop is not a real problem. The resistance, of course, increases with the number of bristles but even with a large number of bristles the pressure drop is much less than that encountered with conventional fractionating columns having the same fractionating power. The number and location of the bristles can be adjusted as desired. A spiral of bristles as illustrated constitutes the preferred form. It is preferred that the bristles be somewhat longer than the distance from the shaft 18 to the inside wall 6 so that they will bend slightly and make intimate contact with the inside wall of 6. However, the bristles need not touch the walls although fractionation is improved if they do so.

It is well known that to distill decomposable substances under vacuum, and especially under high-vacuum conditions, it is necessary to have a relatively unobstructed path for the passage of vapors from the vapor source to the condensing surface. Our invention makes this essential condition possible since the vaporizing and condensing zones are separated by substantially unobstructed space except for the brush, and as explained, the brush offers small resistance to the flow of vapors, especially as compared with the prior art constructions. A still further advantage of our invention is that the brush causes much more intimate contact between reflux condensate and the fractionated vapors.

What we claim is:

1. Fractional vacuum distillation apparatus comprising a generally vertical stationary tubular member of substantially uniform cross section, means for evacuating said stationary tubular member, a rotatable tubular member centrally positioned within said stationary tubular member and substantially coaxial with said stationary tubular member, said rotatable tubular member extending through substantially the longitudinal extent of said stationary tubular member, means for circulating cooling fluid in said rotatable tubular member, means for rotating said rotatable tubular member, a plurality of wire bristles secured to said rotatable tubular member at a multiplicity of axially spaced positions along substantially the length of said rotatable tubular member longitudinally coextensive with said stationary tubular member, said bristles extending radially outward from said rotatable tubular member to the inner surface of said stationary tubular member for condensing vapors passing upwardly through said stationary tubular member and for centrifugally conveying condensate to the inner surface of said stationary tubular member, said bristles being of sufficient length to maintain the unsecured ends of said bristles in sweeping contact with said inner surface of said stationary tubular member for sweeping condensate on said inner surface, and heating means around substantially the extent of said stationary tubular member for heating said stationary tubular member to a temperature sufficient to at least partially re-evaporate said condensate.

2. Fractional vacuum distillation apparatus comprising a generally vertical tubular member, means for evacuating said tubular member, a rotatable hollow shaft centrally positioned within said tubular member and distributed over the major portion of the length of said tubular member, means for circulating cooling fluid in the portion of said shaft longitudinally coextensive with said tubular member, a plurality of bristle elements secured to said shaft at a multiplicity of axially spaced positions along a major portion of the length of said shaft and extending radially outwardly from said shaft to the inner surface of said tubular member for condensing vapors passing upwardly through said tubular member and conveying condensate to said inner surface of said tubular member, said bristle elements being of sufficient length to maintain the unsecured ends of said elements in sweeping contact with the inner surface of said tubular member for mechanically sweeping condensate on said inner surface, and heating means disposed around said tubular member in heating relation with substantially the extent of said tubular member for revaporizing condensate conveyed to the inner surface of said tubular member.

3. Fractional distillation apparatus comprising a generally vertical tubular member of substantially uniform cross section, a rotatable member centrally positioned within said tubular member and generally coaxial with said tubular member, said rotatable member being longitudinally substantially coextensive with said tubular member, means, other than refluxing vapors in said tubular member, for cooling the extent of said rotatable member coextensive with said tubular member, a plurality of bristle-like elements of heat-conducting material secured to said rotatable member at a multiplicity of vertically spaced positions along said rotatable member, said elements extending radially outwardly from said rotatable member to the inner surface of said tubular member for progressively condensing vapors passing upwardly through said tubular member, means for rotating said rotatable member with said bristle-like elements secured to said rotatable member for centrifugally conveying condensate to the inner surface of said tubular member, said bristle-like elements being of sufficient length to maintain the unsecured ends of said elements in sweeping contact with said inner surface of said tubular member for mechanically spreading condensate on said inner surface, and means, other than refluxing vapors, for heating said tubular member to a temperature sufficient to at least partially re-evaporate said condensate.

4. The combination, with a fractionating vacuum still wherein vapors of the liquid to be fractionated are refluxed upwardly through a generally tubular fractionating column and vapors reaching the top of the column are removed from the column, of means for increasing the fractionating power of said still, said still comprising wall means defining an elongated still chamber and means for evacuating said still chamber, said still chamber including a vaporizer pot, a generally tubular fractionating column communicating with said vaporizer pot and extending upwardly therefrom and vapor-removal means communicating with the upper end of said column, said means for increasing the fractionating power of said still comprising heating elements about substantially the extent of said column between said vaporizer pot and said vapor-removal means, a shaft extending longitudinally through said still chamber, means for rotatably mounting said shaft in said still chamber in generally concentric relation with said column, means for rotating said shaft, said shaft being hollow throughout at least the longitudinal portion of said shaft coextensive with said column, the hollow portion of said shaft being closed against communication with said still chamber, means for circulating cooling fluid in said hollow portion of said shaft, and brush means mounted on said shaft in said column and being arranged for conveying condensate across the space between said shaft and said column and for sweeping the surface of said column, said brush means comprising a plurality of wire bristles extending radially outwardly from said shaft at a plurality of axially spaced positions along said shaft, said bristles having sufficient length to maintain the unsecured ends of said bristles in sweeping contact with said column.

5. The combination, with a fractionating vacuum still wherein vapors of the liquid to be fractionated are refluxed upwardly through an evacuated generally tubular fractionating column away from the liquid being distilled and vapors reaching the upper end of the column are removed from the column, of means for increasing the fractionating power of said still, said still comprising a vaporizer pot portion, a generally tubular fractionating column communicating with said vaporizer pot portion and extending upwardly therefrom, vapor-removal means communicating with the upper end of said fractionating column, and means for evacuating said fractionating column, said means for increasing the fractionating power of said still comprising heating means arranged about said fractionating column along substantially the longitudinal extent of said column, a shaft extending through the longitudinal extent of said column, means rotatably mounting said shaft in said fractionating column in generally concentric relation with said column, said shaft being hollow throughout at least the longitudinal portion of said shaft coextensive with said fractionating column, said hollow portion being closed against communication with said fractionating column, means for circulating cooling fluid in said hollow portion of said shaft, means for rotating said shaft, and a plurality of bristles of heat conducting material secured to said shaft at a plurality of axially spaced positions along said shaft, said bristles extending radially outward from said shaft and being of sufficient length to maintain the unsecured ends of said bristles in sweeping contact with said fractionating column.

6. The combination, with a fractionating vacuum still wherein vapors of the liquid to be fractionated are refluxed upwardly through an evacuated generally tubular fractionating column away from the liquid being distilled and vapors reaching the upper end of said column are collected and condensed, said still comprising vapor-generating means, a generally tubular fractionating column communicating with said vapor-generating means and extending upwardly therefrom, vapor-removal means communicating with the upper end of said fractionating column, and means for evacuating said still, of means for increasing the fractionating power of said still, said last-named means comprising heating means arranged in heating relation to said fractionating column throughout substantially the longitudinal extent of said fractionating column, a shaft extending through substantially the longitudinal extent of said fractionating column, means rotatably mounting said shaft in said fractionating column in generally concentric relation with said column, means other than the material being distilled for positively cooling said shaft throughout the portion of said shaft coextensive with said fractionating column, means for rotating said shaft, and brush means mounted on said shaft, said brush means comprising a plurality of bristle-like elements of heat-conducting material extending outwardly from said shaft at a plurality of axially spaced positions along said shaft, said bristle-like elements being of sufficient length to maintain the unsecured ends of said elements in sweeping contact with said fractionating column.

7. The combination, with a fractionating vacuum still wherein vapors of the liquid to be fractionated are refluxed upwardly through an evacuated generally tubular fractionating column away from the liquid being distilled and vapors reaching the upper end of said fractionating column are condensed and collected, of means for increasing the fractionating power of said still, said means comprising heating means arranged about said fractionating column throughout substantially the longitudinal extent of said fractionating column, a shaft extending through the longitudinal extent of said column, means rotatably mounting said shaft generally concentric with said column, said shaft being hollow throughout at least the portion of said shaft coextensive with said column, said hollow portion being closed against communication with said column, means for circulating cooling fluid through the hollow portion of said shaft, means for rotating said shaft, and a plurality of bristle-like elements secured to said shaft at a plurality of axially spaced positions along said shaft, said bristles extending outwardly from said shaft and being of sufficient length to maintain the unsecured ends of said bristles in sweeping contact with said column.

8. The combination, with a fractionating vacuum still wherein vapors of the liquid to be fractionated are refluxed upwardly through an evacuated generally tubular fractionating column and vapors reaching the upper end of said fractionating column are condensed and collected, of means for increasing the fractionating power of said still, said means comprising heating means arranged about said fractionating column throughout substantially the longitudinal extent of said column, a shaft extending through the longitudinal extent of said fractionating column, means rotatably mounting said shaft in generally concentric relation with said column, means other than the material being fractionated for positively cooling at least the longitudinal portion of said shaft coextensive with said fractionating column, means for rotating said shaft, and brush means mounted on said shaft and comprising a plurality of filamentous elements extending generally radially outward from said shaft at a plurality of axially spaced positions along said shaft, said filamentous elements being of sufficient length to maintain the unsecured ends of said filamentous elements in sweeping contact with said fractionating column.

9. The method of fractionating a liquid mixture which comprises maintaining a body of said mixture, progressively vaporizing said mixture by applying heat thereto, causing the vapors to flow under vacuum upwardly away from said body of said mixture along a confined path between transversely spaced-apart surfaces to an exit zone substantially higher and a substantial distance from said body of said mixture, positively heating one of said surfaces along substantially the extent of said confined path, in addition to the heat imparted to said surface by said vapors, positively cooling the other of said surfaces along substantially the extent of said confined path in addition to cooling of said surface by material being fractionated, maintaining a plurality of relatively narrow cooled localized regions in said confined path, said regions extending outwardly from said cooled surface in a direction generally normal to said path and at a multiplicity of successively higher levels along said path, condensing portions of said vapors during travel along said path at said multiplicity of successively higher regions along said path, centrifugally conveying condensate portions at said regions generally crosswise of said path to said heated surface, mechanically sweeping the surface of said condensate portions at said heated surface in a repeated fashion to continually renew the surface of said condensate portions and expose continually renewed surfaces of said condensate portions to vapors moving upwardly along said path, re-evaporating back into said path at least the lighter constituents of said condensate portions at said surface, and repeating said condensing and re-evaporating a multiplicity of times substantially throughout movement of said vapors upwardly along said path.

10. The method of fractionating a mixture of vaporizable materials which comprises progressively vaporizing such mixture, causing the vapors to flow under vacuum upwardly along a confined path between transversely spaced-apart surfaces and out of contact with said mixture to an exit zone substantially higher and a substantial distance from the point of introduction of said vapors into said path, positively heating one of said surfaces by means other than said vapors along substantially the extent of said confined path, positively cooling the other of said surfaces by means other than the material being fractionated along substantially the extent of said confined path, maintaining a plurality of relatively narrow cooled localized regions in said confined path, said regions extending outwardly from said cooled surface in a direction generally normal to said path and at a multiplicity of successively higher levels along said path, condensing portions of said vapors during travel along said path at said multiplicity of successively higher regions along said path, centrifugally conveying condensate portions at said regions generally crosswise of said path to said heated surface, mechanically sweeping the surface of said condensate portions at said heated surface in a repeated fashion to continually renew the surface of said condensate portions and expose continually renewed surfaces of said condensate portions to heated vapors moving upwardly along said path, re-evaporating back into said path at least the lighter constituents of said condensate portions at said surface, and repeatedly condensing and re-evaporating portions of said vapors substantially throughout movement of said vapors upwardly along said path to said exit zone.

EDMOND S. PERRY.
FRANCIS J. MANSING.

REFERENCES CITED

The following references are of record in the file of this patent:

UNITED STATES PATENTS

| Number | Name | Date |
|---|---|---|
| 1,150,115 | Heinze | Aug. 17, 1915 |
| 1,885,697 | Fabbrs | Nov. 1, 1932 |
| 1,888,872 | D'Yarmett | Nov. 22, 1932 |
| 2,040,837 | D'Yarmett | May 19, 1936 |
| 2,210,928 | Hickman | Aug. 13, 1940 |
| 2,224,621 | Voorhees | Dec. 10, 1940 |
| 2,313,175 | Scott et al. | Mar. 9, 1943 |
| 2,317,101 | Lecky | Apr. 20, 1943 |
| 2,403,978 | Hickman | July 16, 1946 |

OTHER REFERENCES

Analytical Ed. Industrial and Engineering Chemistry, July 15, 1943, vol. 15, No. 7, pages 468–470.